Figure 1:
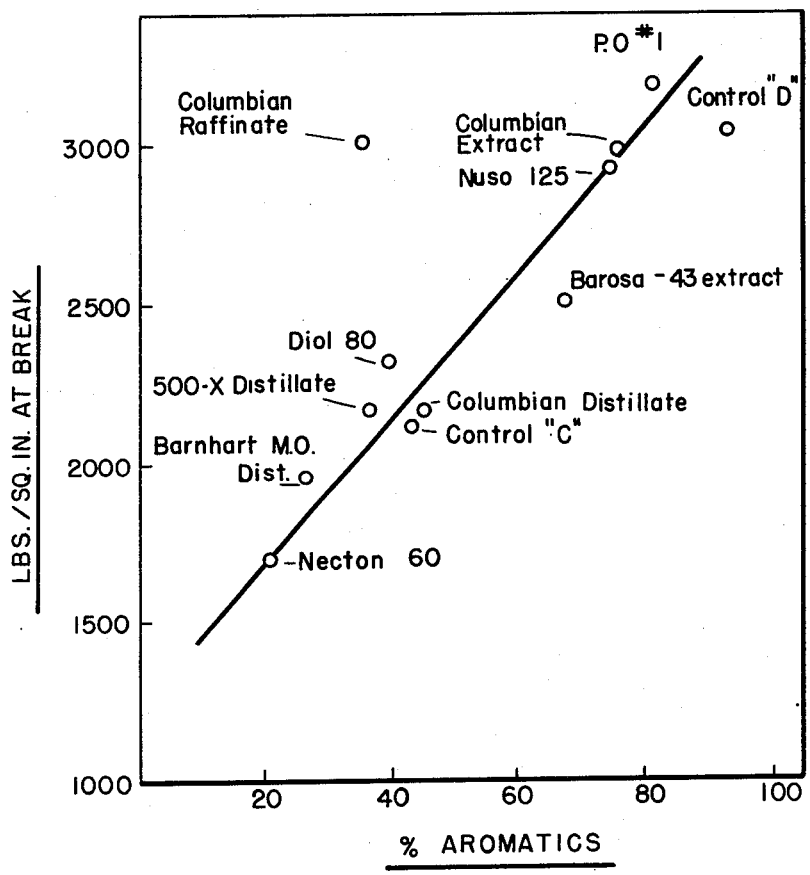

United States Patent Office 2,778,808
Patented Jan. 22, 1957

2,778,808

OIL EXTENDED SYNTHETIC RUBBER COMPOSITIONS

Walter L. Dunkel, Roselle Park, and Francis P. Ford and William C. Dowling, Roselle, N. J., assignors to Esso Research and Engineering Company, a corporation of Delaware Application May 27, 1953, Serial No. 357,812

7 Claims. (Cl. 260—33.6)

This invention relates to improved oil extended-synthetic rubber compositions and relates more particularly to synthetic rubber compositions containing fractions of naphthenic crudes from which a large part of the aromatics have been removed.

It is known to add naphthenic and aromatic hydrocarbon oils to natural and synthetic rubbers, such as GR–S or GR–I as plasticizers and extenders. These oils are good plasticizers and their low cost reduces the cost per pound of the finished rubber. Vulcanizates prepared from such oil-rubber compounds, for example, tire tread stocks, often possess wearing properties superior to those of vulcanizates produced from unextended, lower Mooney synthetic polymers.

The utility of a petroleum oil as an extender is determined by its physical and chemical properties. Not all oils are satisfactory. Thus, only oils containing less than 10-20% of constituents boiling below 700° F., at atmospheric pressure have sufficiently low volatilities to avoid excessive losses from the vulcanizates from use. Similarly, other things being equal, the viscosity of a preferred extender oil should be as low as possible for ease in factory handling.

It has now been found that the chemical constitution of the extender oil has an especially profound influence on the properties of the oil-polymer compound and its vulcanizate.

In general, oils of high aromatic content impart good processing characteristics to the synthetic rubber compositions. These are accompanied by high tensile strengths. On the other hand the dynamic properties of the vulcanizates of oil-extended synthetic rubber compositions are adversely affected by highly aromatic oils. Good processing characteristics and low hysteresis are both quite essential to the manufacture and use of tires, but these are not usually imparted to the polymer by the same oil.

It has now been discovered that a refined petroleum oil which imparts both desired properties to a remarkable degree is obtained by extracting a heavy Colombian crude oil distillate with phenol.

Accordingly, therefore, the main object of the invention is the provision of natural and/or synthetic rubber compositions and particularly synthetic rubber compositions suitable for use as tire or tube stocks; for molding purposes; for the fabrication of printer's rolls, hose, sheets, tubes, and other objects and specialties; for the preparation of adhesives and cements, and for coating, impregnating, waterproofing, and other specialized uses; comprising rubber, and particularly one or more synthetic rubbers, or elastomers, and 25 to 50 parts of the raffinate obtained by extracting a heavy Colombian crude with phenol. The raffinate has the following properties:

Boiling range (°F.) _____ 668–977 (81%)
Spec. grav _____ 0.91
Aniline point (°F.) _____ 201.0
Silica gel analysis:
    Percent arom _____ 35.65
    Percent non-arom _____ 64.35
H/C _____ 1.78/1

The term "rubber" as used herein is intended to define a material which does not possess a definite and reproducible softening point, and which is capable of being vulcanized.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

The following definition is preferred.

"The term rubber is intended to embrace elastomers, whether natural or synthetic, and whether or not admixed with other ingredients such as pigments, softening agents, etc., in the vulcanized or unvulcanized state, the said elastomer being (1) capable of vulcanization such as by the application of heat when in admixture with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly."

The synthetic rubber to which the extender oil is added includes neoprene, butadiene-styrene copolymers, such as GR–S, butadiene-acrylonitrile copolymers, such as GR–N and isobutylene-isoprene copolymers, such as GR–I with or without the incorporation of other additives selected from a list comprising sulfur, accelerators, pigments, resins, antioxidants, fillers, extenders, and/or other plasticizing and/or softening agents, such as stearic acid, pine oil, and pine tar.

The advantages of the invention will be better understood from a consideration of the following experimental data which are given for the sake of illustration, but without intention of limiting the invention thereto:

The following petroleum oil extenders were prepared:

Necton–60—Phenol extract of a naphthenic distillate.
Nuso–125—A Phenol extract of a coastal crude distillate.
500 distillate—Distillate of a coastal crude.
Barnhardt motor oil distillate—Motor oil distillate fraction from a Texas crude.
Roxtone 180—Distillate of a heavy naphthenic Colombian crude.
Barosa–43XT—Phenol extract from a mixed base of Gulf Coast crude.
C–22 Aromatic Oil—The aromatic oil fraction from thermal cracking of the heavy ends obtained by catalytic cracking of virgin gas oil from Texas crude.
Process Oil #1—Phenol extract of a motor oil distillate from a Texas crude.
Circosol–2XH—Commercial oil obtained from the Sun Oil Company.
Control C—Same as Circosol 2XH.
Control D—Commercial oil obtained from the Shell Oil Company.
SPX 97—Commercial oil obtained from the Shell Oil Company.
Barosa X56—A phenol extract from a mixed base gulf coast crude having a higher viscosity than Barosa 43XT.

Center side stream—Is the center side stream from the fractionation of phenol extract from heavy Colombian distillate.

Diol 80—An acid-treated naphthenic distillate.

Colombian distillate—Distillate from a Colombian crude.

Colombian raffinate—Raffinate from phenol extraction of Colombian distillate.

EXAMPLE I

These extenders had the following inspections:

tested for dynamic properties. The following results were obtained:

|  | Circosol-2XH | Colombian Raffinate | Barnhardt Motor Oil Dist. |
|---|---|---|---|
| Aromaticity_____percent__ | 43 | 35.6 | 26.3 |
| Stress-Strain Properties: | | | |
| Modulus @ 300%_____ | 960 | 880 | 1,070 |
| Tensile Strength_____ | 2,680 | 2,490 | 2,750 |
| Dynamic Properties @ 50° C.: | | | |
| Relative Damping__percent__ | 26.0 | 25.5 | 25.5 |
| Dynamic Modulus_____ | 3.17 | 2.94 | 3.03 |
| η(internal friction)_____ | 6.00 | 5.44 | 5.60 |

Table 1A
INSPECTIONS ON PETROLEUM OIL EXTENDERS

| Inspection | Necton 60 | Nuso 125 | 500X Dist. | Barnhardt Motor Oil Distillate | Roxtone 180 | Barosa 43XT | C 22 Aromatic Oil |
|---|---|---|---|---|---|---|---|
| Boiling Range (°F.) (a)_____ | 662+ | 648+ | 738+ | 745+ | 824–977 (23%) | 585+(5%, 684) | 700–900 |
| Refractive Index_____ | 1.4920 | 1.5481 | 1.5080 | 1.4952 | 1.5221 | 1.5327 |  |
| Spec. Gravity_____ | 0.89 | 0.95 | 0.92 | 0.89 | 0.944 | 0.95 |  |
| Aniline Pt. (°F.)_____ | 214.9 | 103.1 | 191.1 | 219.4 | 200.1 | 133.3 | 111.6 |
| Iodine No. (cg./g.)_____ | 11.9 | 25.5 | 17.0 | 15.4 | 23.9 | 20.6 | 34.1 |
| Vol. (percent Wt. Loss) (b)_____ | 0.061 | 0.087 | 0.024 | 0.004 | 0.00 | 0.45 | 0.204 |
| Viscosity: | | | | | | | |
| 100° F_____ | 508.2 |  | 950.8 | 538 | 6828.4 | 287.1 | 981.8 |
| 210° F_____ | 58.08 | 149.9 | 67.85 | 61.68 | 177.8 | 47.4 | 56.82 |
| Viscosity Index_____ | 63.5 |  | 26.8 | 78.6 | –27.3 | 38.5 | –110 |
| Pour Pt. (°F.)_____ | –10 | 45 | –15 | 5 | 20 | 70 | 90 |
| Flash Pt. (°F.) (c)_____ | 445 | 435 | 435 | 460 | 545 | 390 | 410 |
| Silica Gel Analysis: | | | | | | | |
| Percent Arom_____ | 21.25 | 74.5 | 36.75 | 26.35 | 50.6 | 67.71 | 75.85 |
| Percent Non-Arom_____ | 78.75 | 25.3 | 63.25 | 73.65 | 49.4 | 32.29 | 24.15 |

(a) Short Path dist.
(b) 3 hrs. @ 134° C.
(c) Cleveland open cup.

Table 1B
INSPECTIONS ON PETROLEUM OIL EXTENDERS

| Inspection | Col. Dist. | Colombian Raffinate | Col. XT | Diol 80 | Process Oil #1 | Cricosol 2XH | Control C | Control D |
|---|---|---|---|---|---|---|---|---|
| Boiling Range (° F.) (a)_____ | 500–977 (82%) | 668–977 (81%) | 671–977 (84%) | 644+ | 680–980 | 711+(5% 770) | 647+(5% 700) | 646+ |
| Refractive Index_____ | 1.5149 | 1.5005 | 1.5641 | 1.5062 | 1.5583 | 1.5217 | 1.552 | 1.6035 |
| Spec. Gravity_____ | 0.94 | 0.91 | 0.99 | 0.91 | 0.974 | 0.94 | 0.97 | 1.03 |
| Aniline Pt. (° F.)_____ | 177.4 | 201.0 | 94.5 | 204.6 | 106 | 181 | 130 | 2.3 |
| Iodine No. (cg./g.)_____ | 21.5 | 17.8 | 29.4 | 18.1 | 30.4 | 20.7 | 27.4 | 24.5 |
| Vol. (Percent Wt. Loss) (b)_____ | 0.58 | 0.12 | 0.14 | 0.043 | 0.089 | 0.046 | 0.254 | 0.14 |
| Viscosity: | | | | | | | | |
| 100° F_____ | 931.5 | 728.5 | 5,289.9 |  |  | 2,034 |  |  |
| 210° F_____ | 66.73 | 64.19 | 110.6 | 91.9 | 91.9 | 81.5 | 82.52 | 23.1 |
| Viscosity Index_____ | 22.8 | 48.5 | –101 |  |  | –38.2 |  |  |
| Pour Pt. (° F.)_____ | –15 | –15 | 35 | 20 | 20 | 5 | 60 | 60 |
| Flash Pt. (° F.) (c)_____ | 375 | 420 | 420 | 465 | 465 | 430 | 405 | 405 |
| Silica Gel Analysis: | | | | | | | | |
| Percent Arom_____ | 45.0 | 35.65 | 76.4 | 39.9 | 81.4 | 43.0 | 72.5 | 93.42 |
| Percent Non-Arom_____ | 55.0 | 64.35 | 23.6 | 60.1 | 18.6 | 57.0 | 27.5 | 6.53 |

(a) Short path dist.
(b) 3 hrs. @ 134° C.
(c) Cleveland open cup.

EXAMPLE II

Three of the foregoing oils were mixed in an open laboratory mill in accordance with the following recipe:

| | Parts by weight |
|---|---|
| GR-S | 100 |
| Oil | 50 |
| Carbon black | 75 |
| Zinc oxide | 5 |
| Sulfur | 2 |
| BLE stabilizer | 1 |
| Curing aid (Santocure) | 1 |

The mixture was cured for 60 minutes at 287° F. and tested for dynamic properties.

The above data clearly show that Colombian raffinate imparts the lowest internal friction to the GR-S.

EXAMPLE III

Twelve of the oils of Example I were mixed in a #00 laboratory Banbury mill in accordance with the recipe of Example II, and tested for processing characteristics as observed by visual appearance, tensile strength and extension swell. The data are reported in Tables 1A and 1B and Figures 1 and 2.

Table 2A
PROCESSING STUDY

|  | Control "C" | Barosa-43 Ext. | 50-X Dist. | Nusco 125 | Necton-60 | Colombian Dist. |
|---|---|---|---|---|---|---|
| Percent Aromatic | 43.0 | 67.7 | 36.75 | 74.5 | 21.25 | 45.0 |
| Stress-Strain Prop. (orig.-aged 48 hrs. @ 212° F.): |  |  |  |  |  |  |
| 100 | 250-550 | 200-545 | 200-450 | 250-500 | 250-510 | 260-500 |
| 200 | 700-1,400 | 680-1,470 | 650-1,270 | 760-1,470 | 730-1,330 | 710-1,320 |
| 300 | 1,340 | 1,380 | 1,280 | 1,540-2,480 | 1,400 | 1,400 |
| 400 | 1,910 | 2,090 | 1,940 | 2,300 |  | 2,000 |
| 500 |  |  |  | 2,900 |  |  |
| Tensile | 2,110-1,880 | 2,500-2,310 | 2,180-1,805 | 2,930-2,650 | 1,710-1,475 | 2,160-1,915 |
| Elong | 435-260 | 470-295 | 440-265 | 500+-330 | 360-230 | 420-270 |
| Dynamic Prop. @ −10° C.+90° C.: |  |  |  |  |  |  |
| Percent R. D | 42.0-19.25 | 41.0-20.75 | 39.0-21.1 | 54.75-21.1 | 36.4-19.5 | 41.75-21.4 |
| Dyn. Mod | 5.59-3.11 | 5.04-2.68 | 4.20-2.42 | 5.82-2.68 | 4.27-2.73 | 4.72-2.68 |
| $\eta \times 10^{-4}$ | 18.8-4.19 | 16.5-3.93 | 12.9-3.61 | 27.8-4.00 | 12.03-3.50 | 15.76-4.06 |
| Dynamic Prop. @ 50° C. (original-aged): |  |  |  |  |  |  |
| Percent R. D | 24.9-21.1 | 25.5-23.9 | 25.5-20.3 | 26.0-23.9 | 23.9-19.25 | 26.0-23.15 |
| Dyn. Mod | 3.50-4.65 | 2.87-4.93 | 2.58-3.84 | 3.13-4.31 | 2.91-3.19 | 2.87-4.37 |
| $\eta \times 10^{-4}$ | 6.30-6.94 | 5.31-8.47 | 4.77-5.49 | 5.92-7.40 | 5.00-4.30 | 5.43-7.24 |
| Mooney Viscosity (ML @ 212° F.—4 Min.) | 65 | 65 | 64 | 72 | 73 | 68 |
| Extrusion Properties @ 220° F.; 80 R. P. M.; .3/.4 Die: |  |  |  |  |  |  |
| Inches per min | 69.8 | 68.0 | 69.8 | 64.7 | 71.5 | 71.0 |
| Grams per min | 112.9 | 119.4 | 119.2 | 119.4 | 108.8 | 115.3 |
| Grams per inch | 1.617 | 1.756 | 1.708 | 1.845 | 1.522 | 1.624 |
| Cc./in | 1.416 | 1.532 | 1.504 | 1.614 | 1.352 | 1.422 |
| Percent Wt.-Loss (aged 48 hrs. @ 212° F.) | 1.42 | 4.95 | 1.20 | 1.40 | 1.40 | 2.78 |

Recipe: (Banbury mix) High Mooney GR-S—1,000; HAF Black—750; Oil—500; BLE—10; Zinc Oxide—50; Sulfur—20; Santocure—10.

Table 2B
PROCESSING STUDY

|  | Colombian Extract | Colombian Raffinate | Diol 80 | P. O. #1 | Control "D" | Barnhardt Motor Oil Distillate |
|---|---|---|---|---|---|---|
| Percent Aromatic | 76.4 | 35.65 | 39.9 | 81.4 | 93.42 | 26.35 |
| Stress-Strain Prop. (orig.-aged 48hrs. @ 212° F.): |  |  |  |  |  |  |
| 100 | 230-430 | 220-470 | 240-480 | 230-440 | 270-445 | 250-470 |
| 200 | 750-1,280 | 780-1,580 | 710-1,420 | 730-1,310 | 770-1,200 | 700-1,300 |
| 300 | 1,510-2,100 | 1,630 | 1,450 | 1,450-2,240 | 1,450-1,980 | 1,360 |
| 400 | 2,250 | 2,480 | 2,150 | 2,210 | 2,210 | 1,950 |
| 500 | 2,880 |  |  | 2,900 | 2,810 |  |
| Tensile | 2,980-2,465 | 3,000-2,610 | 2,310-1,960 | 3,180-2,640 | 3,030-2,560 | 1,970-1,630 |
| Elong | 510-340 | 480-285 | 420-250 | 550-340 | 540-390 | 410-235 |
| Dynamic Prop. @ −10° C.+90° C.: |  |  |  |  |  |  |
| Percent R. D | 51.0-22.1 | 39.0-19.8 | 40.0-20.3 | 46.5-21.1 | 53.25-22.75 | 39.0-21.1 |
| Dyn. Mod | 5.74-2.65 | 3.95-2.29 | 4.32-2.04 | 5.22-2.65 | 6.88-2.65 | 4.20-2.62 |
| $\eta \times 10^{-4}$ | 24.9-4.17 | 12.1-3.37 | 13.7-2.92 | 20.0-3.96 | 31.6-4.31 | 12.9-3.91 |
| Dynamic Prop. @ 50° C. (original-aged): |  |  |  |  |  |  |
| Percent R. D | 26.0-27.8 | 23.15-21.1 | 23.5-19.8 | 26.8-23.9 | 28.2-23.5 | 24.9-19.8 |
| Dyn. Mod | 3.07-4.31 | 2.68-4.27 | 2.73-4.17 | 2.84-4.17 | 3.31-4.80 | 2.62-4.0 |
| $\eta \times 10^{-4}$ | 5.81-8.81 | 4.44-6.37 | 5.25-5.80 | 5.56-7.16 | 6.88-10.10 | 4.77-5.56 |
| Mooney Viscosity (ML @ 212° F.—4 min.) | 69 | 62 | 67 | 62 | 74 | 68 |
| Extrusion Properties @ 220° F.; 80 R. P. M.; .3/.4 die: |  |  |  |  |  |  |
| Inches per min | 64.5 | 58 | 59.8 | 52.8 | 66.3 | 70.7 |
| Grams per min | 119.5 | 110.7 | 101.3 | 104.8 | 119.2 | 109.5 |
| Grams per inch | 1.853 | 1.909 | 1.985 | 1.985 | 1.798 | 1.549 |
| Cc./in | 1.600 | 1.685 | 1.752 | 1.723 | 1.538 | 1.376 |
| Percent Weight Loss (aged 48 hrs. @ 212° F.) | 2.88 | 2.29 | 1.05 | 1.22 | 2.85 | 0.81 |

Recipe: (Banbury mix) High Mooney GR-S—1,000; HAF Black—750; Oil—500; BLE—10; Zinc Oxide—50; Sulfur—20; Santocure—10.

Figure 2:
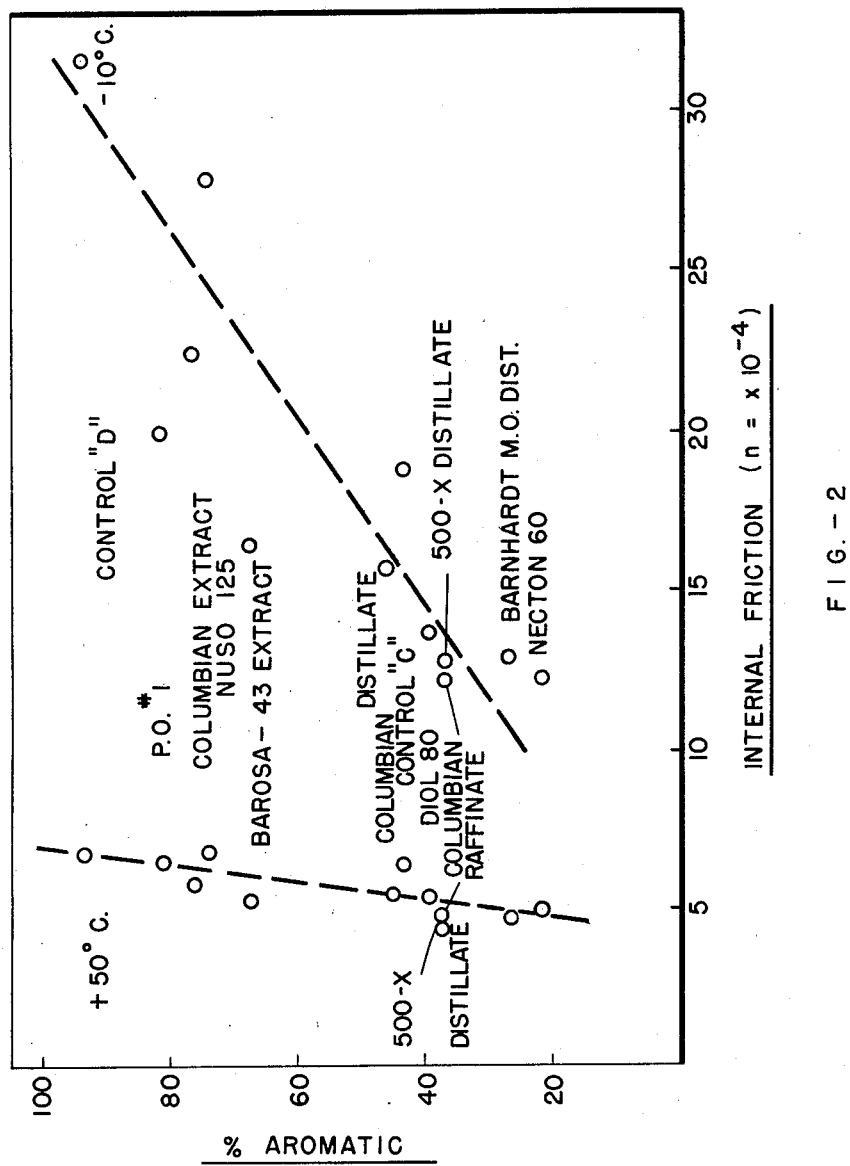

These data show the outstanding superiority of Colombian raffinate as an extender over other oils. For example, the Figure 1 shows that Colombian raffinate which contains only about 40% aromatics imparts a tensile strength of 3000 to the rubber, a value which is not obtained in any other oil containing less than 75%, aromatics. At the same time Figure 2 shows that this same oil imparts a very low internal fraction to the rubber. Thus, Colombian raffinate is unique in imparting both high tensile and low hysteresis to the polymer.

EXAMPLE IV

Five of the oils of Example I were compounded according to Example II in such a way as to produce a relatively poor pigment dispersion. A portion of each batch was remilled to improve the dispersion. The data are reported in Table III.

Table III

|  | 1 Circosol-2XH | 2 SPX-97 | 3 Necton 60 | 4 Col. Raff. | 5 P. O. #1 |
|---|---|---|---|---|---|
| Percent Aromatic | 43.0 | 74.0 | 21.2 | 36.0 | 81.0 |
| Stress and Strain Properties: |  |  |  |  |  |
| 100 | 300 | 270 | 310 | 260 | 280 |
| 200 | 700 | 720 | 740 | 670 | 730 |
| 300 | 1,290 | 1,440 | 1,200 | 1,290 | 1,400 |
| 400 | 1,770 | 2,100 |  | 1,920 | 2,080 |
| 500 |  | 2,650 |  |  | 2,650 |
| Tensile | 1,855 | 2,695 | 1,440 | 2,225 | 2,870 |
| Elong | 430 | 510 | 350 | 460 | 540 |
| Dynamic Properties: |  |  |  |  |  |
| Percent R. D | 24.9 | 26.8 | 21.7 | 25.5 | 26.0 |
| Dyn. Mod | 3.6 | 3.2 | 3.3 | 2.5 | 3.2 |
| $\eta \times 10^{-4}$ | 6.4 | 6.2 | 5.0 | 4.7 | 6.1 |
| Weight Loss (48 hrs. @ 212° F.) Percent | 1.8 | 1.3 | 1.4 | 2.6 | 1.0 |

The above data indicate that even under such conditions of preparation the Colombian raffinate imparts a unique combination of good processing and good dynamic properties to the GR–S composition. The internal viscosity is 4, 7, and the dynamic modulus is 2.5, the lowest of the five oils, while the tensile is 2225, surprisingly high for the aromatic content of the oil.

The nature of the present invention having been thus fully set forth and specific examples of the same given, what is claimed as new and useful and desired to be secured by Letters Patent is:

1. A composition of matter comprising a rubber and a plasticizing amount of an extender oil consisting of a raffinate having approximately the following properties:

| | |
|---|---|
| Boiling range ° F | 668–977 (81%) |
| Specific gravity | 0.90–0.92 |
| Aniline point ° F | 190–210 |
| Iodine No. (cg./g.) | 16–20 |
| Viscosity (SSU at 100° F.) | 700–750 |
| Percent aromatics | 30–40 |
| Pour point ° F | 0 to −30 |
| Viscosity index | 40–55 | said raffinate having been obtained by the phenol extraction of a Colombian crude oil distillate having approximately the following properties:

| | |
|---|---|
| Boiling range ° F | 500–977 (82%) |
| Specific gravity | 0.92–0.96 |
| Aniline point ° F | 175–180 |
| Iodine No. (cg./g.) | 21–22 |
| Viscosity (SSU at 100° F.) | 900–950 |
| Percent aromatics | 40–50 |
| Pour point ° F | 0 to −30 |
| Viscosity index | 20–25 |

2. A composition comprising a synthetic rubber selected from the group consisting of butadiene-styrene copolymers, butadiene-acrylonitrile copolymers, neoprene, and isobutylene-isoprene copolymers and about 25–50 parts by weight based on 100 parts by weight of total composition of an extender oil consisting of a raffinate having approximately the following properties:

| | |
|---|---|
| Boiling range ° F | 668–977 (81%) |
| Specific gravity | 0.90–0.92 |
| Aniline point ° F | 190–210 |
| Iodine No. (cg./g.) | 16–20 |
| Viscosity (SSU at 100° F.) | 700–750 |
| Percent aromatics | 30–40 |
| Pour point ° F | 0 to −30 |
| Viscosity index | 40–55 | said raffinate having been obtained by the phenol extraction of a Colombian crude oil distillate having approximately the following properties:

| | |
|---|---|
| Boiling range ° F | 500–977 (82%) |
| Specific gravity | 0.92–0.96 |
| Aniline point ° F | 175–180 |
| Iodine No. (cg./g.) | 21–22 |
| Viscosity (SSU at 100° F.) | 900–950 |
| Percent aromatics | 40–50 |
| Pour point ° F | 0 to −30 |
| Viscosity index | 20–25 |

3. Composition according to claim 2 which further contains a minor proportion, based on the total composition of a pigment, zinc oxide and sulfur.

4. A composition of matter comprising about 50–75 parts by weight of a synthetic rubbery copolymer of butadiene with styrene and about 25–50 parts by weight of an extender oil consisting of a raffinate having the following properties:

| | |
|---|---|
| Boiling range ° F | 668–977 (81%) |
| Specific gravity | 0.90–0.92 |
| Aniline point ° F | 195–205 |
| Iodine No. (cg./g.) | 17–19 |
| Viscosity (SSU at 100° F.) | 710–740 |
| Percent aromatics | 30–40 |
| Pour point ° F | 0 to −30 |
| Viscosity index | 45–50 | said raffinate having been obtained by the phenol extraction of a Colombian naphthenic crude oil distillate having approximately the following properties:

| | |
|---|---|
| Boiling range ° F | 500–977 (82%) |
| Specific gravity | 0.93–0.95 |
| Aniline point ° F | 175–180 |
| Iodine No. (cg./g.) | 21–22 |
| Viscosity (SSU at 100° F.) | 900–950 |
| Percent aromatics | 42–48 |
| Pour point ° F | 0 to −30 |
| Viscosity index | 20–25 |

5. Composition according to claim 4 which further contains a minor proportion based on the total composition of carbon black, zinc oxide and sulfur.

6. A composition comprising about 50–75 parts by weight of a synthetic rubber selected from the group consisting of neoprene, butadiene-styrene copolymers, butadiene-acrylonitrile copolymers and isobutylene-isoprene copolymers and about 25–50 parts by weight of an extender oil consisting of a raffinate having approximately the following properties:

| | |
|---|---|
| Boiling range ° F | 668–977 (81%) |
| Specific gravity | 0.90–0.92 |
| Aniline point ° F | 195–205 |
| Iodine No. (cg./g.) | 17–19 |
| Viscosity (SSU at 100° F.) | 720–740 |
| Percent aromatics | 33–38 |
| Pour point ° F | −10 to −20 |
| Viscosity index | 47–50 | said raffinate having been obtained by the phenol extraction of a Colombian crude oil distillate having approximately the following properties:

| | |
|---|---|
| Boiling range ° F | 500–977 (82%) |
| Specific gravity | 0.92–0.96 |
| Aniline point ° F | 175–180 |
| Iodine No. (cg./g.) | 21–22 |
| Viscosity (SSU at 100° F.) | 900–950 |
| Percent aromatics | 40–50 |
| Pour point ° F | 0 to −30 |
| Viscosity index | 20–25 |

7. Composition according to claim 6 in which the rubber is a copolymer of butadiene and styrene, the composition further containing a small amount of a curing aid.

References Cited in the file of this patent

UNITED STATES PATENTS 2,582,264   McMillan _____ Jan. 15, 1952

OTHER REFERENCES

Rostler: Rubber Age, 63, 317–326, June 1948.
Rostler: Ind. Eng. Chem., 41, 598–608, March 1949.
D'Ianni: Rubber Age, 317–321, June 1951.
Kurtz: India Rubber World, 126, 495–499, July 1952.